(12) United States Patent
Bhuyar et al.

(10) Patent No.: US 10,417,916 B2
(45) Date of Patent: Sep. 17, 2019

(54) METHOD AND SYSTEM TO PROVIDE CONTEXTUAL AUTO-CORRELATION OF VERTICAL SITUATIONAL DISPLAY OBJECTS TO OBJECTS DISPLAYED ON A LATERAL MAP DISPLAY BASED ON A PRIORITY SCHEME

(71) Applicant: HONEYWELL INTERNATIONAL INC., Morris Plains, NJ (US)

(72) Inventors: Prabhudev Bhuyar, Karnataka (IN); Girish Benakatti, Karnataka (IN); Atmacharan Ajjavara, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 65 days.

(21) Appl. No.: 15/730,022

(22) Filed: Oct. 11, 2017

(65) Prior Publication Data

US 2019/0108759 A1    Apr. 11, 2019

(51) Int. Cl.
*G08G 5/00* (2006.01)
*G06T 11/60* (2006.01)
*B64D 45/00* (2006.01)
*G01C 23/00* (2006.01)
*G01W 1/00* (2006.01)
(Continued)

(52) U.S. Cl.
CPC .......... *G08G 5/0021* (2013.01); *B64D 45/00* (2013.01); *G01C 23/00* (2013.01); *G01W 1/00* (2013.01); *G06T 11/60* (2013.01); *G08G 5/0047* (2013.01); *G08G 5/0091* (2013.01); *B64D 2045/0075* (2013.01); *G01S 7/24* (2013.01); *G01S 19/03* (2013.01)

(58) Field of Classification Search
CPC .............................. G06T 11/60; G08G 5/0021
See application file for complete search history.

(56) References Cited

U.S. PATENT DOCUMENTS

| 7,495,601 | B2 | 2/2009 | Blaskovich et al. |
| 8,660,716 | B1 | 2/2014 | Rahmes et al. |

(Continued)

FOREIGN PATENT DOCUMENTS

| EP | 2354805 A1 | 8/2011 |
| EP | 2696171 A2 | 2/2014 |
| EP | 2955484 A1 | 12/2015 |

OTHER PUBLICATIONS

European Patent and Trademark Office, European Extended Search Report for Application No. EP18199207.4 dated Mar. 11, 2018.

*Primary Examiner* — Jeffrey A Brier
(74) *Attorney, Agent, or Firm* — Lorenz & Kopf, LLP

(57) ABSTRACT

A method and system for displaying contextual correlations of objects of a lateral map (LMAP) display to objects of a vertical situational display (VSD) which includes: receiving a first set of latitude objects of graphic representations of a plurality of conditions on the LMAP display wherein the graphic representations represent a particular condition; receiving a second set of vertical objects of graphic representations of a plurality of conditions on the VSD; and correlating using correlation solutions the first and second set of latitude and vertical objects graphically represented of the particular condition between the LMAP display and the VSD to provide a correlation of both the latitude objects and the vertical objects within the LMAP display for rendering on the LMAP display.

20 Claims, 8 Drawing Sheets

(51) Int. Cl.
    *G01S 19/03*    (2010.01)
    *G01S 7/24*     (2006.01)

(56) References Cited

U.S. PATENT DOCUMENTS

| | | |
|---|---|---|
| 9,147,349 B2 | 9/2015 | Maddanimath et al. |
| 9,234,982 B2 | 1/2016 | Ramaiah et al. |
| 2009/0312893 A1 | 12/2009 | Dwyer et al. |
| 2011/0169665 A1* | 7/2011 | Palanisamy ............ G01C 23/00 340/961 |
| 2014/0104080 A1* | 4/2014 | Maddanimath ...... G08G 5/0021 340/945 |

* cited by examiner

METHOD AND SYSTEM TO PROVIDE CONTEXTUAL AUTO-CORRELATION OF VERTICAL SITUATIONAL DISPLAY OBJECTS TO OBJECTS DISPLAYED ON A LATERAL MAP DISPLAY BASED ON A PRIORITY SCHEME

TECHNICAL FIELD

Embodiments of the subject matter described herein relate to cockpit display methods and systems, more particularly, to cockpit display methods and systems for graphically displaying by a contextual auto-correlation objects and conditions of a vertical situational display (VSD) with objects on a lateral map (LMAP) display for display on the LMAP display in accordance to a priority scheme.

BACKGROUND

The increasing automation of weather information places a greater burden on the flight crew to obtain and interpret weather information pertinent to an ownship flight path. The Next Generation (NextGen) overhaul of the United States airspace system and the companion Single European Sky ATM Research (SESAR) overhaul of the European airspace system creates various trajectory-based mechanisms to improve air traffic management on these continents.

In addition, electronic flight bag (EFB) solutions, which include electronic display systems for the flight deck or cabin crew member use, are gaining in popularity. For example, EFB devices can display a variety of aviation data or perform basic calculations (e.g., performance data, fuel calculations, etc.). In the past, some of these functions had to be manually entered using paper references or were based on data provided to the flight crew by an airline's flight dispatch function. Hence, EFB solutions when displayed add to burdens of interpreting displayed information placed on flight crews.

In response to potential information display overloads, the avionics display systems deployed aboard an ownship has been extensively engineered to visually convey a considerable amount of flight information in an intuitive and readily comprehendible manner. In conventional avionics display systems, the majority of the information visually expressed on a display, such as a primary flight display, pertains to the host ownship's flight parameters (e.g., the heading, drift, roll, and pitch of the host ownship), nearby geographical features (e.g., mountain peaks, runways, etc.), and current weather conditions (e.g., developing storm cells) but fall short of displaying relevant objects and conditions graphically from the VSD on the LMAP display. The use of graphic conditional data on the VSD would make it much easier and faster to visualize a current situation awareness by the pilot when viewed on the LMAP display.

In view of the above described trend toward air crew-centric traffic management, it is desirable to provide an avionics' display system and method for visually expressing additional flight characteristics pertaining to external conditions and objects of an ownship flight path. These flight characteristics may include enhanced awareness of objects and conditions other than traffic in the vicinity of an ownship and displayed on an LMAP display and derived from the VSD where such conditions and objects are superimposed on the LMAP display and viewed with a greater range and visibility than on the VSD.

Accordingly, it is desirable to provide one or more alternatives to the required use and displays interfaces that facilitate these options by displaying appropriate interactions with ownship onboard avionics and applications. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for an ownship for displaying contextual correlations of objects of a lateral map (LMAP) display to objects of a vertical situational display (VSD), the method including: receiving a first set of latitude objects of graphic representations of a plurality of situational conditions on the LMAP display wherein the graphic representations represent a particular situational condition related to at least one of the set which comprises: weather conditions and/or airspace, and are displayed as cutouts of boxes which are overlaid on the LMAP display in manner wherein a rectangular box boundary is defined within the LMAP display and is further labeled with numerical numbers for identifying a particular situation condition; receiving a second set of vertical objects of graphic representations of a plurality of situational conditions on the VSD wherein the graphic representations represent a particular situational condition related to at least one of a set which comprises: weather conditions and turbulence, and are displayed as cutouts of boxes which are overlaid on the VSD in manner wherein a rectangular box boundary is defined within the VSD and is further labeled with numerical numbers for identifying a particular situational condition; correlating using correlation solutions the first and second set of latitude and vertical objects that have been graphically represented of the particular situational condition between the LMAP display and the VSD to provide a correlation of both the latitude objects and the vertical objects within the LMAP display; and rendering on the LMAP display, the first set of latitude objects with a correlated second set of vertical objects based on a priority scheme which is performed in an automated manner wherein the first set is displayed with graphic representations that are different than the second set so that each set is readily discernable enabling improved situational awareness when viewing the LMAP display.

Some embodiments of the present disclosure provide a computer program product tangibly embodied in a computer-readable storage device and including instructions configurable to be executed by a processor to perform a method for displaying auto correlations of objects of a lateral map (LMAP) display to objects of a vertical situational display (VSD), the method including: receiving a first set of latitude objects of graphic representations of a plurality of conditions on the LMAP display wherein the graphic representations represent a particular condition and are displayed as cutouts which are overlaid on the LMAP display in manner wherein a boundary is defined within the LMAP display for identifying the particular condition; receiving a second set of vertical objects of graphic representations of a plurality of conditions on the VSD wherein the graphic representations represent a particular condition, and are displayed as cutouts which are overlaid on the VSD in manner wherein a boundary is defined within the VSD for identifying a particular situational condition; correlating using correlation solutions the first and second set of latitude and vertical objects that have been graphically represented of the particular condition between the LMAP display and the VSD to provide a correlation of both the latitude objects and the vertical objects within the LMAP display; and rendering on the LMAP display, the first set of latitude objects with a correlated second set of vertical objects based on a priority scheme wherein the first set is displayed with graphic representations that are different than the second set so that each set is readily discernable to the pilot to enable improved situational awareness when viewing the LMAP display.

Some embodiments of the present disclosure provide a display configured to render at least a VSD and an LMAP display; and at least one processor in operable communication with the display, the processor configured to: receive a first set of latitude objects of graphic representations of a plurality of conditions on the LMAP display wherein the graphic representations represent a particular condition and are displayed on the LMAP display in manner wherein a boundary is defined within the LMAP display for identifying the particular condition; receive a second set of vertical objects of graphic representations of a plurality of conditions on the VSD wherein the graphic representations represent a particular condition, and are displayed in manner wherein a boundary is defined within the VSD for identifying the particular condition; and correlate using correlation solutions the first and second set of latitude and vertical objects that have been graphically represented of the particular condition between the LMAP display and the VSD to provide a correlation of both the latitude objects and the vertical objects within the LMAP display for rendering on the LMAP display.

Some embodiments of the present disclosure provide a system including: at least one processor; and at least one computer-readable storage device comprising instructions configurable to be executed by the at least one processor to perform a method for displaying correlated items from a VDS on an LMAP display, the method including: receiving a first set of latitude objects of graphic representations of a plurality of conditions on the LMAP display wherein the graphic representations represent a particular condition and are displayed on the LMAP display in manner wherein a boundary is defined within the LMAP display for identifying the particular condition; receiving a second set of vertical objects of graphic representations of a plurality of conditions on the VSD wherein the graphic representations represent a particular condition, and are displayed in manner wherein a boundary is defined within the VSD for identifying a particular situational condition; and correlating using correlation solutions the first and second set of latitude and vertical objects that have been graphically represented of the particular condition between the LMAP display and the VSD to provide a correlation of both the latitude objects and the vertical objects within the LMAP display for rendering on the LMAP display.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
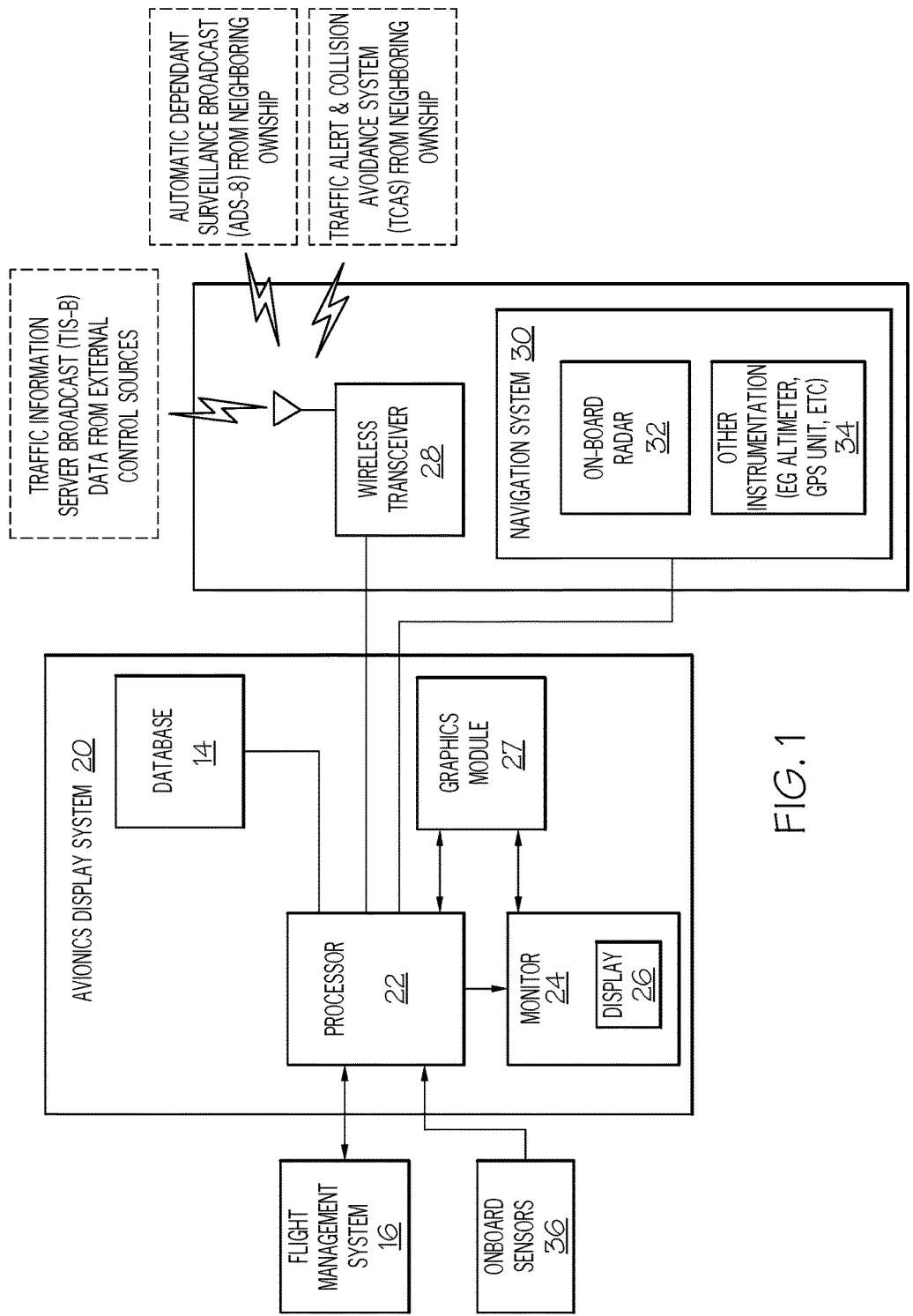
FIG. 1 depicts a block diagram of an exemplary ownship navigation and control system, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to representations of correlated objects and conditions in a cockpit display to enable better ownship performance by, for example, an increase in airport runway arrival rates and capacity during high demand periods and facilitates ownship optimized descents along with reduced workload for monitoring during such activities by better visualization of such objects and conditions to the flight crew on the LMAP display. That is, existing human interfaces and corresponding displays do not provide sufficient situational awareness of condition and object elements and leave achieving a result to the analysis and assumptions of the flight crew. In addition, in certain cases, this insufficient situation awareness may have a cascade affect and not only diminish the efficient operation of a particular ownship but may also affect the operations of other ownships. For example, a delay in achieving a particular spacing goal on approach of a particular ownship can result in timing delays relayed to other subsequent ownships following the same arrival path. Hence, the awareness of external elemental objects and conditions and subsequent control and maneuver of a particular ownership in accordance with a flight path is crucial to achieving or not achieving such savings and schedule adherence.

For example, one of the goals of the VSD is to display the vertical position information unambiguously because three dimensional views have positional ambiguity in airspace. Next, during an ownship's flight path, there is customarily a greater reliance on the VSD during a particular flight phase such as the takeoff and landing, while the LMAP display may be relied upon more during the auto-pilot cruise period of a particular flight path. Further, the VSD provides for improved safety, especially with respect to early condition recognition when flying approaches, and also allows for a maintenance of a stabilized path. The flight crew by viewing both co-planar views gains an intuitive view of the vertical situation from the VSD, and from the LMAP display is provided with an intuitive depiction of the horizontal situation. Therefore, additional situational awareness can be realized when condition and object features from the VSD display are viewed concurrently on the LMAP display. Hence, when the objects and conditions of the VSD are superimposed on the LMAP display and, as pointed out, particularly during flight phases where reliance on the VSD is greater, greater situational awareness is derived by the flight crew upon viewing the LMAP display which was not the case in the past when such additional information was not correlated, superimposed and displayed on the LMAP display.

In addition, EFB solutions as mentioned are fed by the flight crew with flight plans of a particular ownship and a target ownship in the EFB along with external condition information such as wind conditions. The use of correlated objects and conditions on the LMAP display is also helpful because with the EFB solutions which are displayed on EFB displays the pilot may have to perform both heads up and heads down activities to monitor multiple cockpit displays during a particular flight phase and additional information on the LMAP display may aid in presenting condition and object information to the pilot during such head up and head down monitoring activities.

For example, while interval management operations are in progress of a particular ownship, the pilot may often have to check the EFB display for any new speed commands issued by a flight interval management (FIM) application which is being fed into the onboard systems of the ownship. That is, the pilot may have to periodically check the EFB display to view any deviation from an assigned spacing goal (ASG) given by the air traffic controller (ATC). This may require a head down and a head up activity of the pilot or flight crew during a descent phase of a particular flight path to properly monitor the ownership course and instructions received when viewing multiple cockpit displays; such multiple heads up and heads down activities increase the difficulties for the pilot and flight crew to form an accurate mental picture of the current and predicted state of the particular ownship. The use of correlated conditions and objects on the LMAP display may reduce such situational awareness difficulties experienced by providing more information on a singular display enabling a pilot upon viewing the singular display to gain better situational perspectives.

In addition, current display systems of an ownship may provide an elevation view of weather condition on the VSD, but are not equipped to display a wider range of weather information on the VSD display related to, for example, particular weather patterns from a weather condition such as wind and turbulence flows. While the wind and turbulence patterns are displayed on the VSD of current display systems, the wind and turbulence information is not correlated and are outputted from a radar system to a LMAP display. As a result, inconsistent information may be provided of weather conditions by the two different systems to the flight crew because the weather condition may only be displayed on the LMAP and not on the VSD or vice versa. The correlation of LMAP and VSD items may prevent such inconsistencies and resulting visual confusions from occurring, and may also assist the pilot by providing better cockpit displays of weather and object data visually in a singular display to the pilot.

Therefore, there exists a need to provide additional data to prevent such inconsistencies from being viewed by the flight crew. To meet this goal of better situational awareness, applications that show the viewed results with better contextual auto-correlation of LMAP objects to vertical situational display objects for a particular flight path but not necessarily limited to the particular flight path of the ownship are needed. Such applications may allow the flight crew to monitor external factors more clearly and to enable better possibilities of the ownship achieving, as instructed by the flight crew, a required activity in accordance with the monitored external flight conditions.

In addition, for implementation, it is also desirable to use the improved display applications in meeting the goal of improving situational awareness as such display applications can be conveniently enabled and easily implemented in current and legacy ownship displays without a need for additional wiring and display device attachments in their adoption.

Certain terminologies are used with a regard to the various embodiments of the present disclosure. For example, a display unit is an ownship onboard device that provides a user interface for a particular avionic system onboard an ownship, which may include a Flight Management System (FMS), Communications Management Function (CMF), assigned spacing goal (ASG), achieve by point (ABP), automatic dependent surveillance broadcast (ADS-B), flight information services-broadcast (FIS-B) or other avionics systems. The flight crew members may use the FMS interface to perform tasks associated with flight planning, navigation, guidance, and performance. The processor may be coupled to the display unit to format communications of data transmissions originating from one or more avionics systems onboard an ownship, and which are directed to a cockpit display onboard the ownship.

FIG. 1 depicts a block diagram of an exemplary ownship navigation and control system, in accordance with the disclosed embodiments. FIG. 1 is a functional block diagram of a generalized avionics display system 20 in accordance with an exemplary embodiment. The avionics display system 20 includes at least one processor 22 and at least one monitor 24, which is operatively coupled to processor 22. During the operation of the avionics display system 20, the processor 22 drives the graphics module 27 which, in conjunction with processor 22, drives the monitor 24 to produce a graphics display 26 that visually provides the pilot and flight crew with information pertaining to the ownship and to neighboring ownship within a predetermined vicinity of the host ownship. The graphical display 26 may include visual representations of one or more flight characteristics pertaining to a neighboring ownship, as described more fully below. The processor 22 may generate a graphic display 26 in a two-dimensional format (e.g., as a lateral or vertical profile map display) or in a hybrid format (e.g., in a picture-in-picture or split screen arrangement) and may be incorporated into all units capable of displaying TCAS data;

e.g. the primary flight display, the multi-function display, and the interactive navigation display.

The processor 22 may comprise, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below, for example, processor 22 may be included within a Flight Management Computer (FMC) of the type commonly deployed within a Flight Management System (FMS).

The image-generating devices suitable for use as monitor 24 include various analog (e.g., cathode ray tube) and digital (e.g., liquid crystal, active matrix, plasma, etc.) display devices. In certain embodiments, monitor 24 may assume the form of a Head-Down Display (HDD) or a Head-Up Display (HUD) included within an ownship's Electronic Flight Instrument System (EFIS). The monitor 24 may be disposed at various locations throughout the cockpit. For example, the monitor 24 may comprise a primary flight display (PFD) and reside at a central location within the pilot's primary field-of-view. Alternatively, the monitor 24 may comprise a secondary flight deck display, such as an Engine Instrument and Crew Advisory System (EICAS) display, mounted at a location for convenient observation by the ownship crew but that generally resides outside of the pilot's primary field-of-view. In still further embodiments, monitor 24 may be worn by one or more members of the flight crew.

The processor 22 includes one or more inputs operatively coupled to one or more air traffic data sources. During operation of the avionics display system 20, the air traffic data sources continually provide the processor 22 with navigational data pertaining to any neighboring ownship. In the exemplary embodiment illustrated in FIG. 1, the air traffic data sources include a wireless transceiver 28 and a navigation system 30, which are operatively coupled to first and second inputs of processor 22, respectively. The navigation system 30 includes an onboard radar 32 and various other onboard instrumentation 34 such as a radio altimeter, a barometric altimeter, a global positioning system (GPS) unit, and the like. In a preferred embodiment, navigation system 30 may be included within a FMS; and on-board radar 32 may be included within a Terrain Awareness and Warning System (TAWS), such as an Enhanced Ground Proximity Warning System (EGPWS).

In some embodiments, graphical displays 26 may provide an output from the on-board radar 32 of the ownship. For example, graphic displays 26 may provide a top-down view, a horizontal view, or any other view of a weather condition, an object and/or a particular terrain detected by the on-board radar 32 of the ownship. The views of a weather condition may include monochrome or color graphical representations of the weather. A graphical representation of a weather condition may include an indication of altitude (or altitudinal coordinates) of those objects or the altitude relative to the ownship.

The avionics display system 20 provides the display information to the pilot or flight crew in a highly intuitive manner. For this exemplary embodiment, the avionics display system 20 includes the processor 22 connected to a database 14, a flight management system 16, a navigation system 30, a graphics module 27, and a graphics display 26.

Further, it is contemplated that while the avionics display system 20 appears in FIG. 1 to be arranged as an integrated system, the present disclosure is not intended to be so limited and may also include an arrangement whereby one or more of processer(s) 22, database 14, flight management system 16, navigation system 30, graphics module 27, and graphics display 26 is a separate component or a subcomponent of another system located either onboard or external to an ownship.

Also, for example, avionics display system 20 may be arranged as an integrated system (e.g., ownship display system, Primary Flight Display system, etc.) or a subsystem of a more comprehensive ownship system (e.g., flight management system, navigation and control system, target aiming and control system, collision alert and/or avoidance system, weather avoidance system, etc.). Furthermore, the present disclosure is not limited to ownship displays, and may also be implemented for other types of vehicles' electronic displays (such as, for example, spacecraft navigation displays, ship navigation displays, submarine navigation displays, train navigation displays, motor vehicle navigation displays, etc.).

The database 14 may also include, for example, a terrain database, which may include the locations and elevations of natural terrain obstacles such as mountains or other elevated ground areas, and also the locations and elevations of man-made obstacles such as radio antenna towers, buildings, bridges, etc. As another example, airport and runway location data, and other types of high priority target data (e.g., locations of incoming traffic to avoid, constructed waypoints, obstacles in the ownship's flight path, etc.) may be retrieved and/or received by processer 22 from a suitable source of such data, such as, for example, an onboard flight management system database (e.g., a component of flight management system 16), an onboard navigation database (e.g., a component of navigation system 30), onboard sensors 36 or the on-board radar 32, or an external database (e.g., via a data communication up-link).

The ownship may be any aviation vehicle that uses a flight management system 16 as a primary user interface for flight crew interaction with the avionics display system 20 onboard the ownship. The ownship may be implemented as an airplane, helicopter, spacecraft, hovercraft, or the like. The one or more avionics systems may include a Flight Management System (FMS), aircraft interface device (AID) or the like. Data obtained from the one or more avionics systems may include, without limitation: flight plan data, ownship state data, weather data, brake system data, fuel and weights data, runway analysis data, ownship performance data, or the like.

Figure 2:
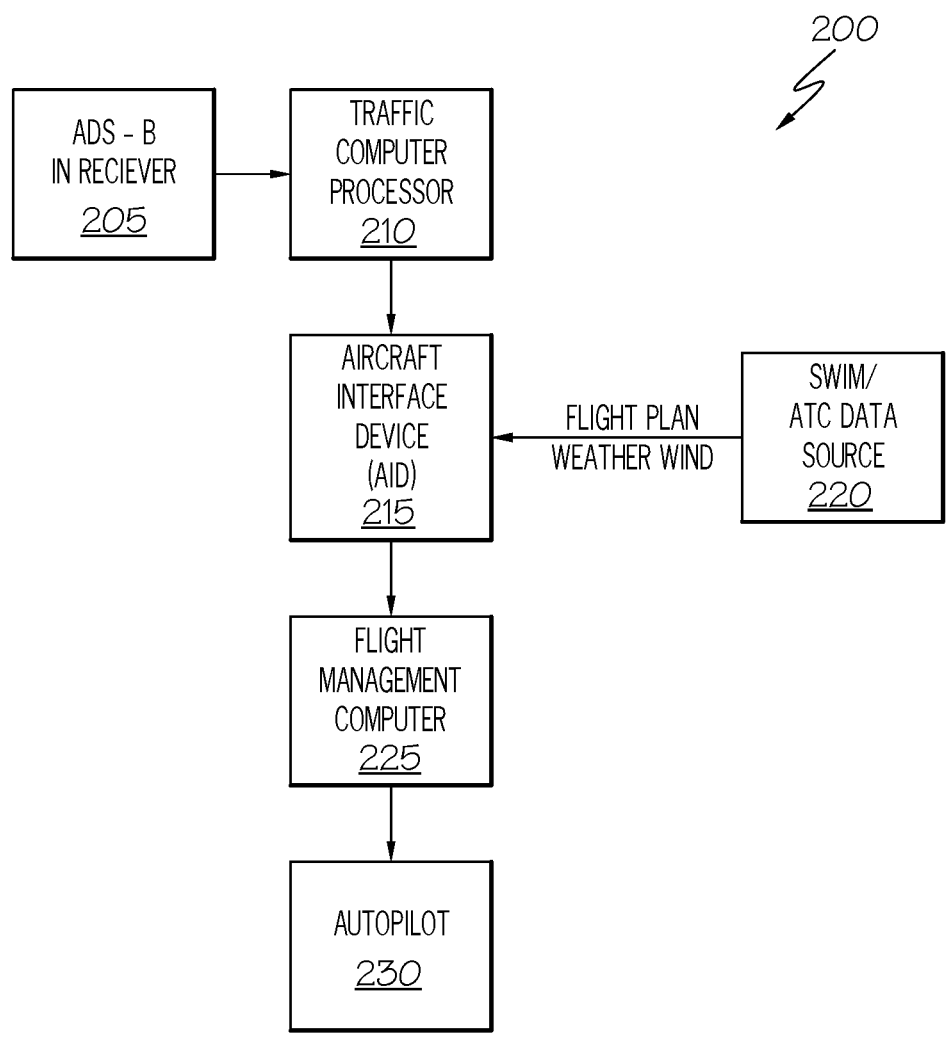
FIG. 2 depicts a block diagram of an exemplary ownship navigation and control system, in accordance with the disclosed embodiments.

FIG. 2 depicts a block diagram 200 of an exemplary ownship navigation and control system, in accordance with the disclosed embodiments. FIG. 2 includes an automatic dependent surveillance broadcast (ADS-B) receiver 205 which is an integral component of NextGen national airspace strategy were the ownship receives flight information services-broadcast (FIS-B) and traffic information services broadcast (TIS-B) data and other ADS-B data such as direct communication from nearby ownships at a traffic computer 210. The traffic computer 210 receives the ADS-B in and generates the target ownship state parameters to an aircraft interface device (AID) 215. Also, the AID 215 receives the flight data, weather, wind as well as inputs received from a System Wide Information Management/Air Traffic Control (SWIM/ATC) data source 220. The aircraft interface device (AID) 215 is coupled to the FMC 225 and sends speed data to the autopilot 230.

The ADS-B receiver 205 is considered an air traffic data source in that ADS-B receiver 205 receives navigational data from external control sources and relays this data to traffic computer 210. For example, ADS-B receiver 205 may receive Traffic Information Services-Broadcast (TIS-B) data from external control sources. In a preferred embodiment, the ADS-B receiver 205 receives Traffic Collision Avoidance System (TCAS) data, and may receive Automatic Dependent Surveillance-Broadcast (ADS-B) data from neighboring aircraft. This data, and other such external source data, is formatted to include air traffic information, which may be utilized to determine a neighboring aircraft's current position and the existence and location of air traffic.

In addition, the TCAS is an airborne system that detects and tracks aircraft near a host ownship. TCAS includes a processor, antennas, a traffic display (e.g. an LMAP display, a VSD, etc.), and means for controlling the aviation display system, such as is shown in FIG. 1. The processor and antennas detect and track other aircraft by interrogating their transponders, and tracking these potential intruders on a display. The TCAS processor analyzes the transponder replies to determined range, bearing and relative altitude. If the system determines that a potential hazard exists, it issues visual and aural advisories to the crew. The visual advisory takes the form of symbols on the one or more traffic displays; e.g. the LMAP display and VSD.

Figure 3:
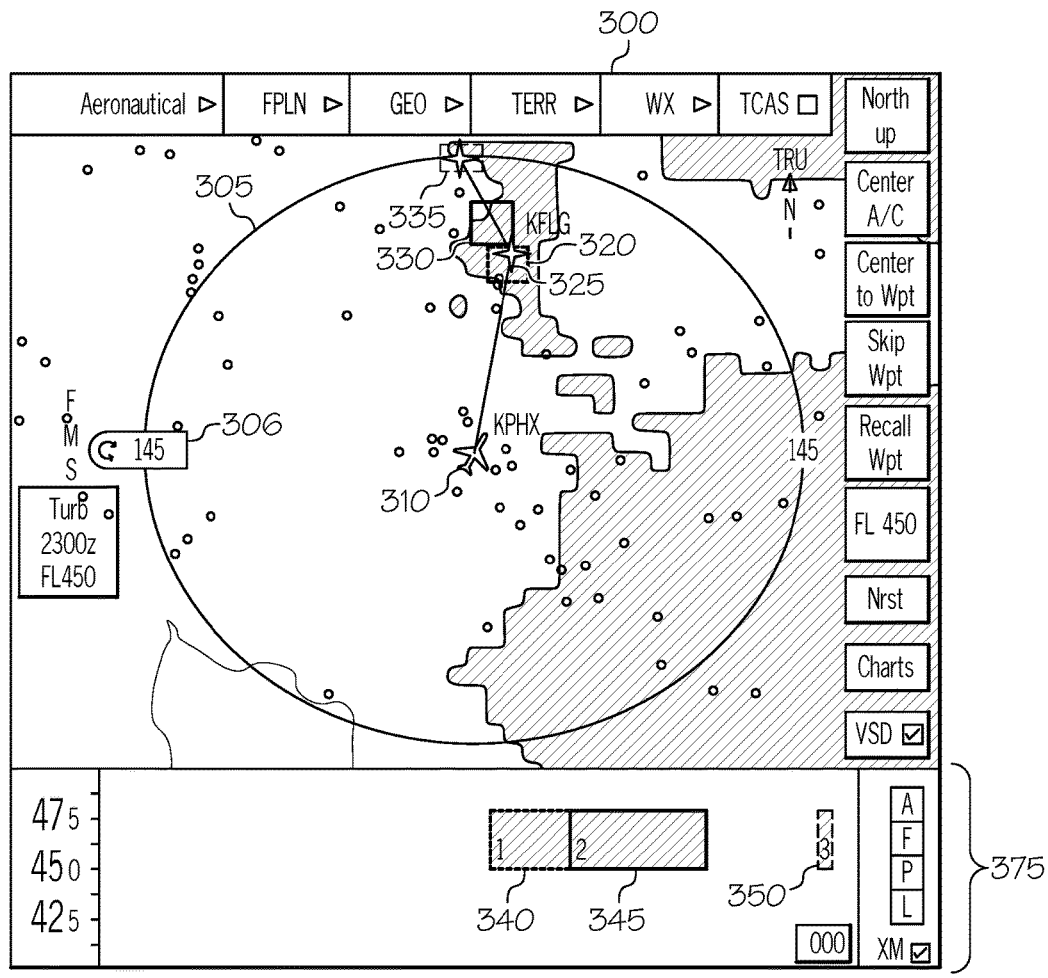
FIG. 3 is a simplified snapshot of a two dimensional LMAP display that may be generated on the display included in the avionics display system shown in FIG. 1 in accordance with the disclosed embodiments.

FIG. 3 is a simplified snapshot of a two dimensional LMAP display that may be generated on the display included in the avionics display system shown in FIG. 1 in accordance with the disclosed embodiments. FIG. 3 depicts a LMAP display between lateral map and VSD objects. While an LMAP display of the type shown in FIG. 3 provides horizontal situational awareness to a pilot, a VSD provides vertical situational awareness in a similar manner. The LMAP display 300 includes a top-view ownship symbol 310, and flight plan represented by one or more waypoint symbols KPHX and KFLG and interconnecting line segments, and one or more range ring(s) 305. The lateral situation display of the LMAP display 300 preferably includes various map features including, but not limited to, a lateral two-dimensional view of terrain below the flight plan, boundaries, and navigation aids.

The range ring 305, only one of which is shown in FIG. 3, indicates a nautical distance from the top-view ownship symbol 310. In the illustrated embodiment, the range ring 305 includes a range indicator 306, which displays the lateral distance from the ownship's present position to the position on the lateral map of the LMAP display 300 that corresponds to the range ring 305 (e.g., 145 nautical miles). It will be appreciated that the value of the range indicator 306 may be set manually or automatically, via a pop-up window task menu. It is also noted that the flight-related data, the LMAP display 300, and a VSD display may be displayed in various combinations. The flight plan and subsequent flight path is displayed as a series of geometric shapes of the cutout boxes but may include other shapes such as, for example, squares, rectangles, or circles, and further of degrees of translucency when displayed through which the pilot is to fly a predicted flight path of the ownship.

In an exemplary embodiment, the LMAP display 300 of FIG. 3, the top-view ownship symbol 310 of the ownship 325 is displayed in a particular flight path on the lateral situational display of the LMAP display 300 navigating past two cutouts of a cutout 320 labeled "1" and a cutout 330 labeled "2" within the range ring 305, which has an indicated range of approximately 145 nautical miles, in a path in the direction of a cutout 335 outside the range ring 305. The cutouts 320 and 330 may indicate a condition of turbulence but it is contemplated that such cutouts can represent any number of conditions, objects, points of reference, flight plan objects, navaids, airways, etc. . . . . For example, the cutouts may represent any other objects or conditions that may assist in pilot awareness or may show improvement in pilot awareness. These cutouts 320 and 330 represent the correlated items from the VSD and are positioned in corresponding X and Y coordinate locations on the LMAP display 300. Hence, the pilot or flight crew by viewing the LMAP display 300 is able to discern or ascertain additional condition or object data that has been generated on an alternative display of the VSD in vertical planar space; for viewing in the horizontal planar space of the LMAP display 300. In addition, the cutouts 320 and 330 are further referenced and identified in a region outside the range ring 305 display or lateral map region of the LMAP display 300 as cutout 340 labeled "1" and cutout 345 labeled "2" in a legend region 375 of the LMAP display 300. In addition, a cutout 350 labeled "3" corresponding to the cutout 335 outside the range ring 305 is partly shown in the legend region 375. As the ownship 310 proceeds in the flight path, the cutout 350 and corresponding cutout 335 will be more visibly displayed.

Continuing with the exemplary embodiment, a raster weather condition is displayed in the legend region illustrating a turbulence condition on the VSD is numbered as "1" and "2" in the set of cutout regions in the legend section on the LMAP display 300 and highlighted by the cutout boxes. That is, the turbulence on VSD display 300 or generated for the VSD graphics display environment, are numbered and highlighted in a select region proportional to the cutout boxes. In addition, these cutout boxes can be or are correlated in at least an approximate, more exact, or even an exact manner to regions in the LMAP display 300. In addition, the cutout regions are or may include an indication of the altitude or altitude coordinates relative to the top-view ownship symbol 310. Also, the cutout size and shape may be determined in accordance with a particular condition, object or item. For example, several coordinates of the altitude, latitude, and longitude of the particular condition maybe processes to identify a size or shape of the condition and a corresponding cutout can be generated corresponding to this identified size or shape. In an alternate embodiment, each cutout may be of a fixed size representing a condition in accordance with its fixed size or may be displayed in advance in a flight plan for a particular airspace.

Also, vector products which may be generated by radar scans in a lateral plane are numbered and highlighted by the cutouts. That is, the planar information of several coordinates can be processed and interpolated to determine patterns of conditions represented by the cutouts. Additionally, the planar information may be derived from inputs of multiple radar scans in horizontal and vertical planar regions resulting in cross-sectional areas to formulate patterns and magnitudes of wind and other conditions related to external stimuli.

Figure 4:
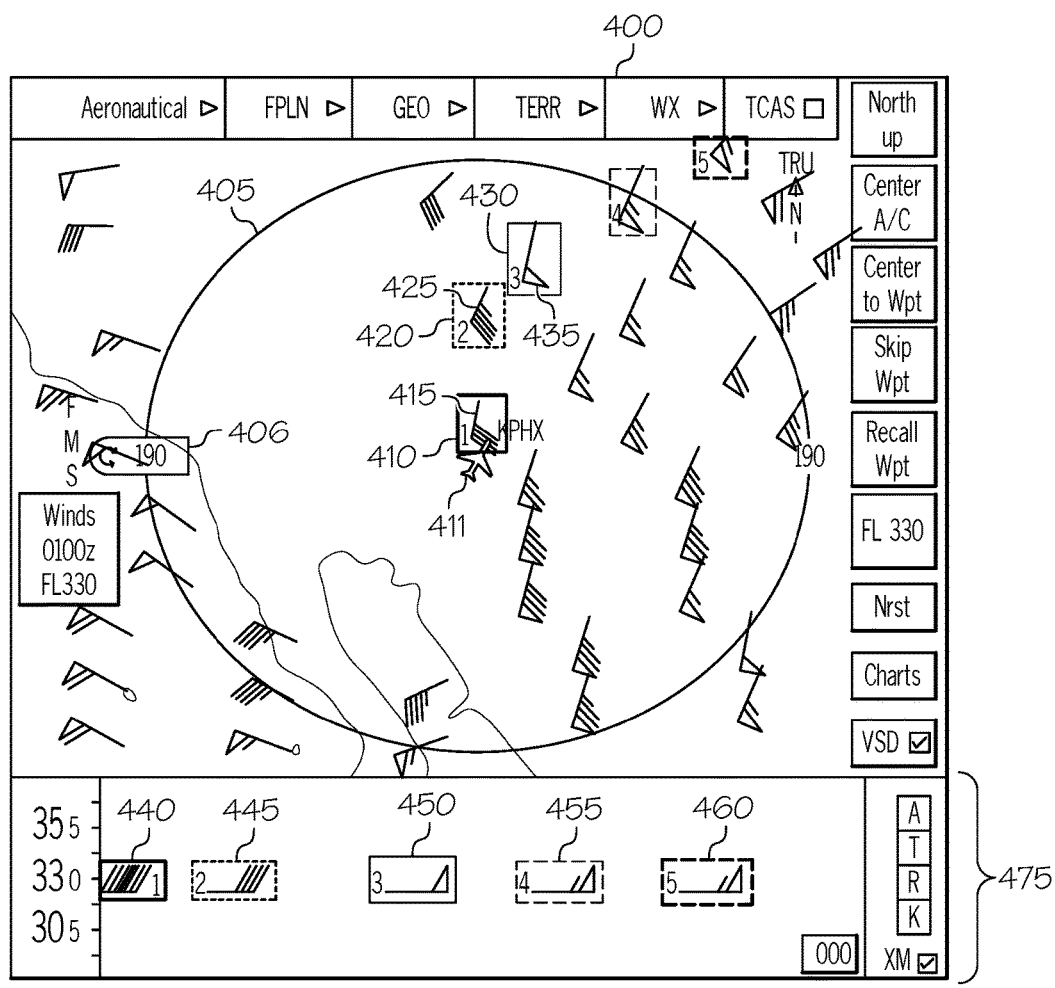
FIG. 4 is a simplified snapshot of a two dimensional LMAP display that may be generated on the display included in the avionics display system shown in FIG. 1 in accordance with the disclosed embodiments.

FIG. 4 is a simplified snapshot of a two dimensional LMAP display that may be generated on the display included in the avionics display system shown in FIG. 1 in accordance with the disclosed embodiments. FIG. 4 depicts an LMAP display 400 showing objects from a VSD display transformed by various linear transforms to be displayed on the both with LMAP objects and the VSD objects transformed on the LMAP display 400. In legend region 475 (below the terrain map) of the display of the lateral map of the LMAP display 400 there is illustrated a legend of the objects or cutouts for indicating magnitudes of wind conditions or turbulence. For example, cutout 440 labeled "1" illustrates with several hash-marks objects an approximate magnitude or wind, likewise cutout 445 labeled "2" illustrates a higher magnitude of wind or turbulence with more hash-marks objects placed in series. In the same vein, cutout 450 labeled "3" illustrates an even higher magnitude with the hash-marks objects placed in series closer together to give an appearance of filled rectangular region or rectangular block of marking which in turn indicates a wind or turbulence of a higher magnitude or above a certain preset threshold. The cutout 455 and the cutout 460, each respectively labeled "4" and "5" show combinations of hash-marks objects and filed rectangular regions which again indicate a step up in the magnitude of the weather condition i.e. the magnitude of turbulence or wind.

With a continued reference to FIG. 4, the range ring 405 shows a range by range indicator 406 of 190 nautical miles. The LMAP display 400 includes a top-view ownship symbol 411, and flight plan represented by a waypoint symbols KPHX with the region of a cutout 410 labeled "1" with a hash-mark object 415 with an ownship path in the direction of cutout 420 labeled "2" with a hash-mark object 425 to a subsequent cutout 430 labeled "3" with a hash-mark object 435. These cutouts 410, 420, and 430 correspond to the cutouts 440, 445, and 450 in the legend region 475. In other words, the pilot may select a particular corresponding cutout in the legend region 475 using user interface tools to have displayed further data about the particular cutout. In addition, additional data of the cutout may be displayed in the legend region 475 so as not to obscure the terrain, other objects on the LMAP display 400. Hence, by displaying magnitudes of the weather condition of wind and turbulence using visual indicators of the magnitude of the condition, and by correlating objects to the LMAP display 400 from the VSD, the pilot by viewing the LMAP display 400 may form a map of the external conditions at a particular instance in flight and therefore may gain better situational awareness immediately rather than having to switch to viewing an alternate display of the VSD showing the objects. The pilot simply by viewing the LMAP display 400 can ascertain the direction and coordinates oriented to the ownship of weather condition which may or may not be an approaching condition in the ownship path. The LMAP display 400 provides an intuitive depiction of the horizontal as well as aspects of the vertical situation for an enhanced situational awareness of external conditions about the ownship.

Figure 5:
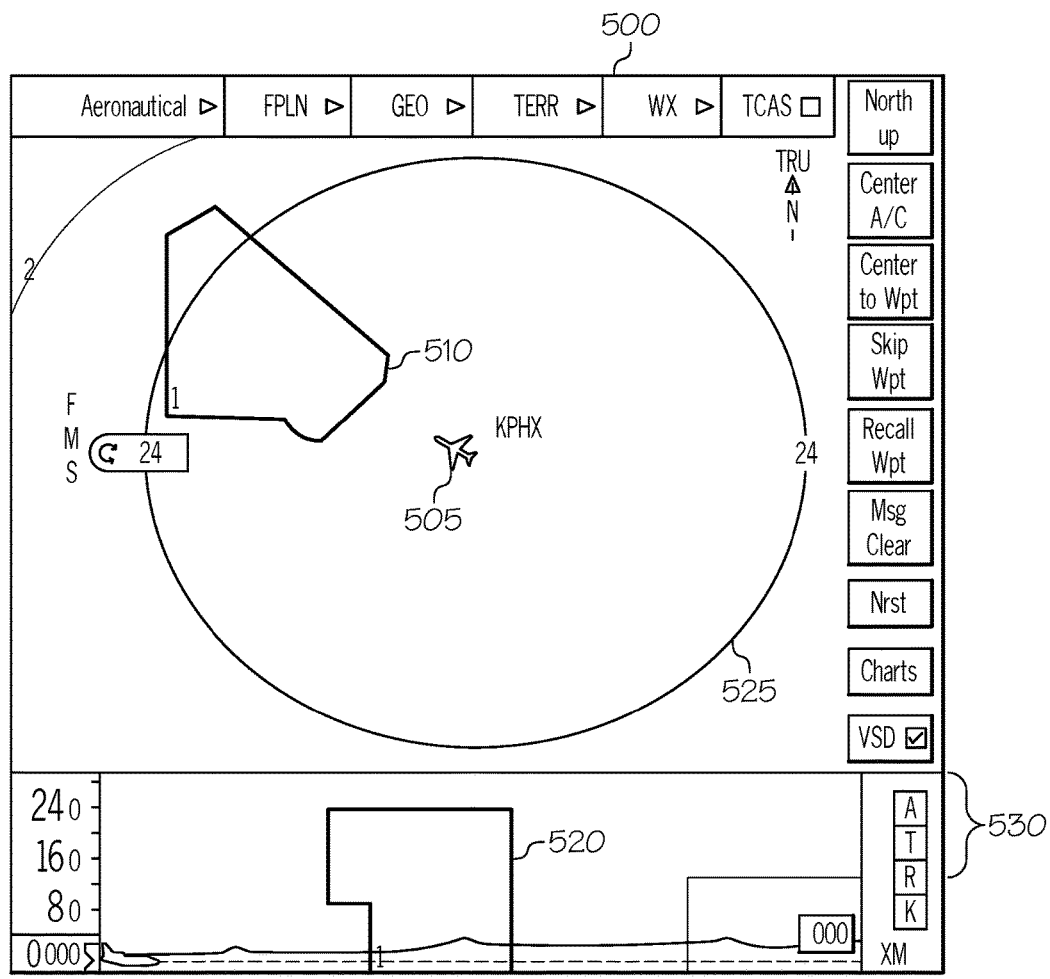
FIG. 5 is a simplified snapshot of a two dimensional LMAP that may be generated on the display included in the avionics display system shown in FIG. 1 in accordance with the disclosed embodiments.

FIG. 5 is a simplified snapshot of a two dimensional LMAP that may be generated on the display included in the avionics display system shown in FIG. 1 in accordance with the disclosed embodiments. FIG. 5 illustrates the airspace both inside and outside the range ring 525 displayed of a top-view ownship symbol 505 heading into the nautical airspace 510 labeled "1" in the VSD 500. The nautical airspace 510 is also displayed in the legend region 530 as a cutout 520. The nautical airspace 510 is a graphic rendering of an airspace on the VSD 500 and provides vertical situation awareness to the pilot. The nautical airspace 510 on the VSD may be labeled and formed as a cutout 520 by the pilot. The pilot may then select the cutout 520 on the VSD 500 to manually correlate an airspace in the vertical plane with the airspace in the horizontal plane of the LMAP display. That is, the cutout 520 enables a correlation by the pilot from the VSD 500 to the LMAP display. The cutout 520 on the VSD provides the pilot and flight crew with an intuitive view of the vertical situation related to the LMAP display then provides an intuitive depiction of the horizontal situation as well as correlated objects of the VSD 500 from the particular cutout. Thus, the crew can access the vertical situation quickly, reducing overall workload.

It is further contemplated that the same condition or object will be highlighted on the LMAP display and the VSD to provide enhanced situational awareness around the particular ownship. It is still further contemplated that embodiments disclosed herein will highlight the same condition or object on the LMAP and VSD displays by hovering a cursor on the condition or object in either display and selecting (clicking on) the condition or object (i.e. a cursor selection event) to highlight the condition or object in both displays when they are in the visible range of their respective displays.

Figure 6:
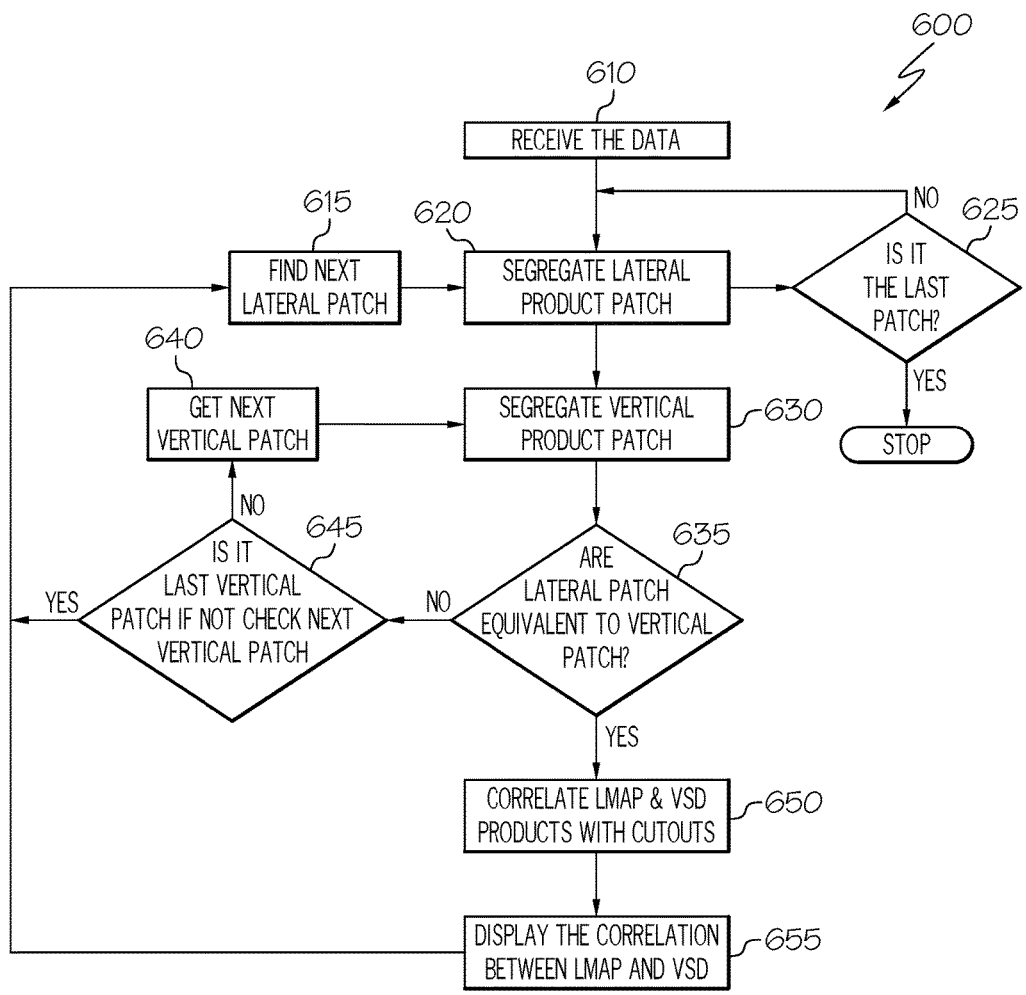
FIG. 6 is a flowchart illustrating an exemplary process that may be performed by the avionics display system shown in FIG. 1 for correlating and highlighting associated objects and conditions from the VSD to the LMAP display in accordance with the disclosed embodiments.

FIG. 6 is a flowchart illustrating an exemplary process that may be performed by the avionics display system shown in FIG. 1 for correlating and highlighting associated objects and conditions from the VSD to the LMAP display in accordance with the disclosed embodiments. FIG. 6 illustrates a correlation in a process 600 between the conditions and objects on the VSD to the LMAP display. Initially, at task 610, data is received for display in the LMAP display and VSD from the sensors, instrumentations, on-board radars, or via the wireless transceiver of various broadcast services. This data is processed by processers of the avionics display system for display. At task 620 the data is segregated into a lateral area of the product patch or region for correlating with a corresponding vertical area of a vertical product patch or region for display. That is, the data is received in a segregated pipeline where planar horizontal data is received as particular lateral product patches which correspond to a patch of vertical planar data in the defined location which is received at 630 as segregated vertical product patches. In other words, a first patch in a horizontal plane of lateral product patch for combining with a subsequent patch of a vertical product patch correlate by the position of the patch in the LMAP display to the patch in the VSD display.

Next, at task 635 a determination is made by a processor whether the lateral patch is equal to the vertical patch. That is, an algorithmic solution is applied to determine if a linear equivalency exists between the disparate patch data locations where if the determined linearity falls within certain criteria then both data sets of the lateral product and the vertical product are deemed to be equal. If, at task 650, both patches correlate, and therefore the LMAP display and VSD product cut out correlate then at task 655 the display in a particular product patch of both the LMAP display and VSD objects maybe displayed. Further, if there are additional lateral patches for correlating and segregating, the flow proceeds back to task 615 to feed the next lateral patch in the segregator to segregate again at task 620 the next segregated lateral patch. In addition, if at task 635, an alternate determination is made, that is the next vertical patch is not equal to the lateral patch, the flow reverts to task 645 to perform a round robin through the other available vertical patches 60 looking for a match. If the pipeline of the vertical patches is completed, at task 645 a determination 625 will be if additional vertical patches exist and if not, the flow will revert to task 615. From there, the flow will proceed via tasks 620 and 630 and then in the alternate, via task 635 to task 650 to again decides of equality at 635 if the LMAP and VSD product with the cutout.

Figure 7:
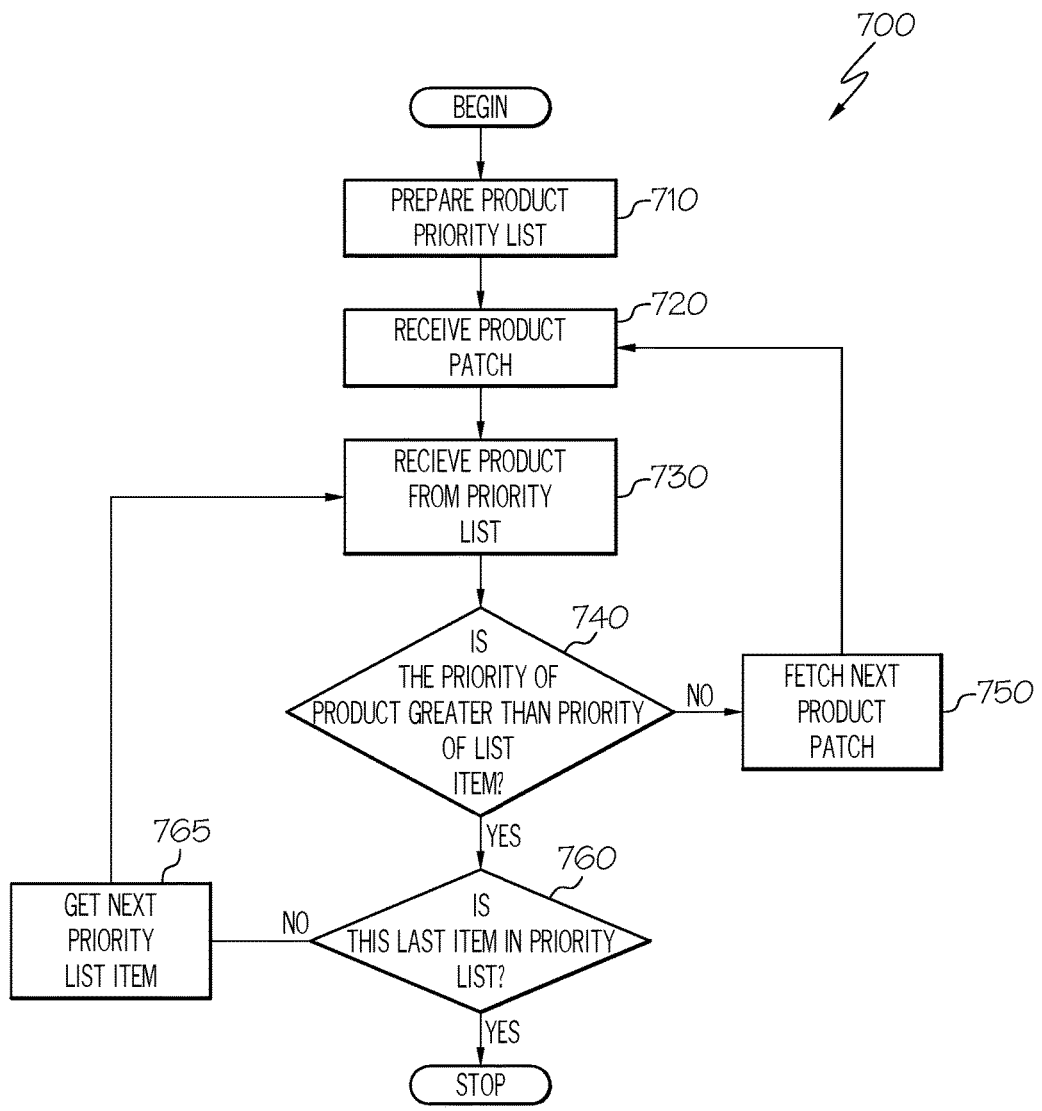
FIG. 7 is a flowchart illustrating an exemplary process that may be performed by the avionics display system shown in FIG. 1 for correlating and highlighting associated objects and conditions from the VSD to the LMAP display in accordance with the disclosed embodiments.

FIG. 7 is a flowchart illustrating an exemplary process that may be performed by the avionics display system shown in FIG. 1 for correlating and highlighting associated objects and conditions from the VSD to the LMAP display in accordance with the disclosed embodiments. FIG. 7 illustrates a priority schema process 700 to determine the priority scheme for the displaying of the cutouts and objects on the LMAP display. When displaying objects in the LMAP display, the objects to be displayed must be displayed in manner that does not obscure the viewpoint of the flight crew of more important objects, display symbols and instrumentation. This is especially true during the takeoff and landing phase of an ownship flight where important maneuvers based on heading and tracking symbols and bugs indicated on the LMAP display must be executed for safe operation of the ownship. In FIG. 7 a process for determining the priority of a products in accordance with a product priority list is illustrated. Initially, at task 710, a product priority list is prepared and this product priority list is received for use with the product patch at task 720. That is the product priority list at task 710 indicates a priority of the products to be displayed in the product patch at task 720. At task 730, a particular product or products from the product priority list are selected. Next, at task 740, a determination is made whether the priority of the products is greater that the priority of the list items. Alternately, at task 750 if the priority of the products is deemed not greater than the priority of the list item, then flow reverts to task 720 to receive another product patch.

Next, at task 760, through the round robin sorting, if the list has been completed or that the last item in the priority list has been reached, then at task 760, the correlating of the items or objects to the LMAP is performed. That is, the objects and products of the LMAP and VSD are correlated as there are no further objects or products to be considered and the set of items is completed. If, in the alternate, the last item in the priority has not been reached, the flow reverts and at task 765, a request is made to get another or the next priority list item.

As previously described, corresponding items and objects displayed on the LMAP display and the VSD may be graphically highlighted with cutouts over the location of turbulence, wind or other weather conditions. Alternatively, other configuration may be used to emphasize the items such as semi-transparent cutouts or shapes.

In yet another example, the objects and items may be highlighted with a graphical representation of lines extending from the selected objects or items in one of the displays and extending to its corresponding objects or items in the other display. For example, after selecting particular cutout in the LMAP display, a line is generated and displayed extending from cutout on the LMAP display to object on the VSD. A line is also generated extending from cutout or object on the LMAP display to object or item on the VSD that may be, in instances, hidden beneath various symbols corresponding to ownship on the LMAP display. The lines may be generated similarly or may be distinguishable in color, thickness, or style (solid, dashed, etc.). Color may be based on the color of the symbol. For example, line may be shown as solid, and line is shown as dashed.

Figure 8:
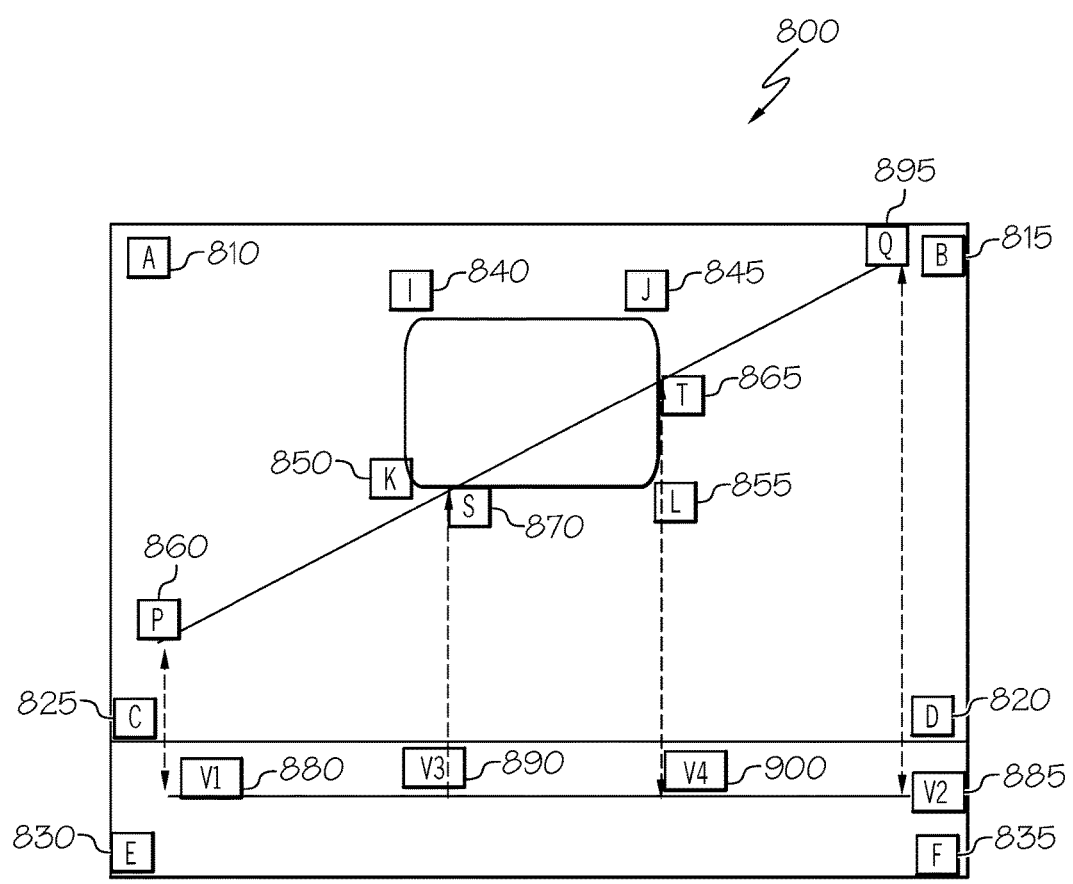
FIG. 8 is graphical representations illustrating various methodologies for correlating and highlighting objects and conditions from the VSD to the LMAP display in accordance with the disclosed embodiments.

FIG. 8 is diagram illustrating the X and Y coordinate transforms process 800 from the VSD display to the LMAP display in accordance with an exemplary embodiment. The coordinates "ABCD" indicated as coordinate "A" 810, coordinate "B" 815, coordinate "C" 825, and coordinate "D" 820 are the polar coordinates (PF) of the LMAP. The coordinates "CDEF" indicated as coordinate "C" 825, coordinate "D" 820, coordinate "E" 830, and coordinate "F" 835 are the coordinates of the VSD. The section "PQ" of coordinate "P" 860 and coordinate "Q" 895 is the section of the LMAP represented in the VSD as $V_1V_2$ ($V_1$ 880 and $V_2$ 885). The coordinates "IJKL" which comprise the perimeter or boundary of the patch and indicated as coordinate "K" 850, coordinate "L" 855, coordinate "I" 840, and coordinate "J" 845 on the LMAP. The patch of the VSD of $V_3V_4$ ($V_3$ 890 and $V_4$ 900) is represented by coordinate "ST" indicated as coordinate "S" 870 and coordinate "T" 865 which is within the patch of the LMAP of coordinates "IJKL". That is, if a line segments of $V_3$ 890 to coordinate "S" 870 and $V_4$ 900 to coordinate "L" 855 are inside of the perimeter or boundary of the patch formed of coordinates "IJKL", then the "IJKL" defined patch and the $V_3V_4$ ($V_3$ 890 and $V_4$ 900) defined patch are considered corresponding patches and both patches can be auto-correlated.

An exemplary thought not definitive list of vertical objects for correlation are as follows:
Airport/Heliport
Navaids
Intersections
Airways
Airspace
Obstacles
Lightening and Strikes
Weather
Flight Plan Objects (Waypoints etc.)
Reference Fixes
Terrain
Equi Time Point
Point of No Return
Visual Reference Points
Runway/Taxiways Thus, there has been provided a system and method for correlating objects and conditions appearing on the LMAP display and the VSD so as to enhance situational awareness by facilitating the identification of objects and conditions vertically as well as laterally using current LMAP and VSDs, thus enabling the crew to identify respective objects and condition in proximity to the ownship on the LMAP and take whatever action may be appropriate. In addition, to the correlating of the objects and conditions on the LMAP, the correlation solution is performed according to a priority list.

The priority list and priority schema is based on the context presented of the ownship. An exemplary and again not definitive priority schema may be as follows:
Priority Schema
1. Airborne Weather
2. Lightening and Strikes
3. Obstacles
4. Flight Objects
5. Navaids
6. Intersections
7. Airport
8. Heliport
9. Airway
10. Airspace
11. Visual Reference Points
12. Equi Time point
13. Point of No Return
14. Runways/Taxiways
15. Reference Fixes The weather conditions are given the highest priority during the particular flight phase represented by the above priority schema while flight management obstacles, airspace and visual aids are given a lesser priority. Finally, runway and reference fixes are given the least priority. However, the priority schema is not static but rather dynamic and it is contemplated depending on the flight that the priority schema will or may change. For example, during an approach phase navaids and airspace references may be given a higher priority and upon landing phase, runway and taxiways references would also be given a higher priority.

The various tasks performed in connection with processes 600, 700 and 800 may be performed by software, hardware, firmware, or any combination thereof. For illustrative purposes, the preceding description of processes 600, 700 and 800 may refer to elements mentioned above in connection with the FIGS. 1-5. In practice, portions of processes 600, 700 and 800 may be performed by different elements of the described system. It should be appreciated that processes 600, 700 and 800 may include any number of additional or alternative tasks, the tasks shown in the FIGS. 1-8 need not be performed in the illustrated order, and processes 600, 700 and 800 may be incorporated into a more comprehensive procedure or process having additional functionality not described in detail herein. Moreover, one or more of the tasks shown in the FIGS. 1-8 could be omitted from embodiments of the processes 600, 700 and 800 as long as the intended overall functionality remains intact.

Techniques and technologies may be described herein in terms of functional and/or logical block components, and with a reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1 and 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of displaying contextual correlations of objects of a lateral map (LMAP) display to objects of a vertical situational display (VSD), the method comprising:

receiving a first set of latitude objects of graphic representations of a plurality of situational conditions on the LMAP display wherein the graphic representations represent a particular situational condition related to at least one of the set which comprises: weather conditions and/or airspace, and are displayed as cutouts of boxes which are overlaid on the LMAP display in manner wherein a rectangular box boundary is defined within the LMAP display and is further labeled with numerical numbers for identifying the particular situation condition;

receiving a second set of vertical objects of graphic representations of a plurality of situational conditions on the VSD wherein the graphic representations represent a particular situational condition related to at least one of a set which comprises: weather conditions and turbulence, and are displayed as cutouts of boxes which are overlaid on the VSD in manner wherein a rectangular box boundary is defined within the VSD and is further labeled with numerical numbers for identifying the particular situational condition;

correlating using correlation solutions the first and second set of latitude and vertical objects that have been graphically represented of the particular situational condition between the LMAP display and the VSD to provide a correlation of both the latitude objects and the vertical objects within the LMAP display; and rendering on the LMAP display, the first set of latitude objects with a correlated second set of vertical objects based on a priority scheme which is performed in an automated manner wherein the first set is displayed with graphic representations that are different than the second set so that each set is readily discernable to the pilot to enable an improved situational awareness when viewing the LMAP display.

2. The method of claim 1, further comprising:
rendering on the LMAP display, the first set of latitude objects with the correlated second set of vertical objects based on the priority scheme along a flight path of the ownship.

3. The method of claim 1, further comprising:
correlating using the first and second set of latitude and vertical objects that have been graphically represented of the particular situational condition between the LMAP display and the VSD along a flight path of an ownship to provide a correlation of both the latitude objects and the vertical objects within the LMAP display.

4. The method of claim 1, further comprising:
correlating in a region defined of the LMAP display by the rectangular box boundary to a corresponding region defined in the VSD by the rectangular box boundary, the first and second set of latitude and vertical objects that have been graphically represented of the particular situational condition between the LMAP display and the VSD to provide a correlation of both the latitude objects and the vertical objects within the region defined of the LMAP display.

5. The method of claim 1, the priority scheme further comprising:
assessing a priority with the particular situational condition to a phase of a flight path of the ownship wherein the priority is raised or lowered for the particular condition by a determination of the phase of the flight path.

6. The method of claim 1, wherein the LMAP display displays a pattern of the particular situational condition when related to a weather or turbulence condition.

7. The method of claim 1, further comprising:
generating a plurality of particular conditions for display on the LMAP display of at least one or more of a set which comprises: weather conditions, lighting strikes, obstacles, flight objects, Navaids, visual and fixed reference points, airports and related items, and airspace.

8. A computer program product tangibly embodied in a computer-readable storage device and comprising instructions configurable to be executed by a processor to perform a method for displaying contextual correlations of objects of a lateral map (LMAP) display to objects of a vertical situational display (VSD), the method comprising:
receiving a first set of latitude objects of graphic representations of a plurality of conditions on the LMAP display wherein the graphic representations represent a particular condition and are displayed as cutouts which are overlaid on the LMAP display in manner wherein a boundary is defined within the LMAP display for identifying the particular condition;
receiving a second set of vertical objects of graphic representations of a plurality of conditions on the VSD wherein the graphic representations represent a particular condition, and are displayed as cutouts which are overlaid on the VSD in manner wherein a boundary is defined within the VSD for identifying the particular condition;
correlating using correlation solutions the first and second set of latitude and vertical objects that have been graphically represented of the particular condition between the LMAP display and the VSD to provide a correlation of both the latitude objects and the vertical objects within the LMAP display; and
rendering on the LMAP display, the first set of latitude objects with a correlated second set of vertical objects based on a priority scheme wherein the first set is displayed with graphic representations that are different than the second set so that each set is readily discernable to the pilot to enable improved situational awareness when viewing the LMAP display.

9. The method of claim 8, wherein the boundary is labeled with numerical numbers for identifying the particular condition.

10. The method of claim 8, further comprising:
rendering on the LMAP display, the first set of latitude objects with the correlated second set of vertical objects based on the priority scheme along a flight path of the ownship.

11. The method of claim 8, further comprising:
correlating using the first and second set of latitude and vertical objects that have been graphically represented of the particular condition between the LMAP display and the VSD along a flight path of an ownship to provide a correlation of both the latitude objects and the vertical objects within the LMAP display.

12. The method of claim 8, further comprising:
correlating in a region defined of the LMAP display by the boundary to a corresponding region defined in the VSD by the boundary, the first and second set of latitude and vertical objects that have been graphically represented of the particular condition between the LMAP display and the VSD to provide a correlation of both the latitude objects and the vertical objects within the region defined of the LMAP display.

13. The method of claim 8, the priority scheme further comprising:
assessing a priority with a particular condition to a phase of a flight path of the ownship wherein the priority is raised or lowered for the particular condition by a determination of the phase of the flight path.

14. The method of claim 8, wherein the LMAP display displays a pattern of the particular condition when related to a weather or turbulence condition.

15. A display configured to render at least a VSD and an LMAP display; and
at least one processor in operable communication with the display, the processor programmed to:
receive a first set of latitude objects of graphic representations of a plurality of conditions on the LMAP display wherein the graphic representations represent a particular condition and are displayed on the LMAP display in manner wherein a boundary is defined within the LMAP display for identifying the particular condition;
receive a second set of vertical objects of graphic representations of a plurality of conditions on the VSD wherein the graphic representations represent a particular condition, and are displayed in manner wherein a boundary is defined within the VSD for identifying the particular condition; and correlate using correlation solutions the first and second set of latitude and vertical objects that have been graphically represented of the particular condition between the LMAP display and the VSD to provide a correlation of both the latitude objects and the vertical objects within the LMAP display for rendering on the LMAP display.

16. The display of claim 15, wherein the processor is further programmed to:
   render on the LMAP display, the first set of latitude objects with a correlated second set of vertical objects based on a priority scheme wherein the first set is displayed with graphic representations that are different than the second set so that each set is readily discernable to the pilot to enable improved situational awareness when viewing the LMAP display.

17. The display of claim 15, wherein the processor is further programmed to:
   render on the LMAP display, the first set of latitude objects with the correlated second set of vertical objects based on the priority scheme along a flight path of the ownship.

18. The display of claim 15, wherein the processor is further programmed to:
   correlate using the first and second set of latitude and vertical objects that have been graphically represented of the particular condition between the LMAP display and the VSD along a flight path of an ownship to provide a correlation of both the latitude objects and the vertical objects within the LMAP display.

19. The display of claim 15, the priority scheme further comprising:
   assess a priority with a particular condition to a phase of a flight path of the ownship wherein the priority is raised or lowered for the particular condition by a determination of the phase of the flight path.

20. The display of claim 15, wherein the LMAP display displays a pattern of the particular condition when related to a weather or turbulence condition.

\* \* \* \* \*